United States Patent [19]
Hoffa

[11] Patent Number: 4,869,135
[45] Date of Patent: Sep. 26, 1989

[54] APPARATUS FOR STEP STRIPPING WIRE MEANS

[75] Inventor: Jack L. Hoffa, Brea, Calif.
[73] Assignee: Eubanks Engineering Co., Monrovia, Calif.
[21] Appl. No.: 220,480
[22] Filed: Jul. 18, 1988
[51] Int. Cl.[4] .............................................. H02G 1/12
[52] U.S. Cl. ................................................... 81/9.51
[58] Field of Search ....................... 81/9.4, 9.51, 9.42, 81/9.44

[56] References Cited

U.S. PATENT DOCUMENTS

| | | |
|---|---|---|
| Re. 18,978 | 10/1933 | Rotherham . |
| 1,433,320 | 10/1922 | Wersal . |
| 1,477,678 | 12/1923 | Wetmore . |
| 2,645,959 | 7/1953 | Fuchs . |
| 2,671,363 | 3/1954 | Wells . |
| 2,880,635 | 4/1959 | Harris . |
| 3,176,550 | 4/1965 | Marcotte . |
| 3,222,957 | 12/1965 | Kramer et al. . |
| 3,376,627 | 4/1968 | Sitz . |
| 3,552,449 | 1/1971 | Solihull et al. . |
| 3,570,100 | 3/1971 | Kindall et al. . |
| 3,838,612 | 10/1974 | Inami . |
| 3,881,374 | 5/1975 | Gudmested . |
| 3,921,472 | 11/1975 | Gudmested et al. . |
| 3,951,016 | 4/1976 | Gudmested . |
| 4,027,557 | 6/1977 | Stepan . |
| 4,091,695 | 5/1978 | Funcik et al. . |
| 4,112,791 | 9/1978 | Wiener . |
| 4,261,230 | 4/1981 | Sindelar . |
| 4,543,717 | 10/1985 | Luka . |
| 4,601,093 | 7/1986 | Cope . |
| 4,745,828 | 5/1988 | Stepan . |

FOREIGN PATENT DOCUMENTS 609834 10/1948 United Kingdom .

Primary Examiner—Roscoe V. Parker
Attorney, Agent, or Firm—William W. Haefliger

[57] ABSTRACT

Apparatus for stripping sheathing from wire at controllable depth, includes:

(a) a frame,
(b) wire clamp mechanism on the frame for sidewardly clamping the wire sheathing, at a location spaced from the end of the wire advanced past the clamp mechanism,
(c) a carriage on the frame linearly movable longitudinally toward and away from the wire clamp mechanism,
(d) a rotating spindle on the carriage and structure including a blade or blades on the spindle and rotatable thereby to rotatably cut into the wire sheathing at a location proximate the guide,
(e) a wire engaging guide mounted on the carriage independently of the spindle for sidewardly engaging the wire sheathing at a location between the clamp mechanism and the blade structure,
(f) a control on the spindle to control the depth of cutting of the blade structure into the sheathing, and as the spindle rotates,
(g) and a drive operatively connected with the carriage to carry the blade structure to selected positions along the wire and at which the blade structure then cuts into the sheathing, to controlled depth, the carriage being retractable to pull a cut plug of the sheathing endwise off the wire.

19 Claims, 8 Drawing Sheets

APPARATUS FOR STEP STRIPPING WIRE MEANS

BACKGROUND OF THE INVENTION

This invention relates generally to the stripping of sheathing or insulation off wire or cable cores, at wire or cable ends; and more specifically it concerns compact, automatically operable apparatus for controllably effecting the wire end stripping function, as well as being operable with respect to wires and cables of different sizes.

Manual, or manually controlled tool stripping of wire ends is time consuming and inaccurate, and commonly results in damage to the wire core. The problem becomes acute as the diameter of the wire decreases, as extremely fine insulated wire is difficult to handle, as by gripping and the thickness of the insulation becomes so small that damage to the core by gripping and/or stripping tools becomes almost unavoidable For example, gripping clamps subject to arc-travel gripping movement by axially movable conical devices can create wire control and handling problems, including insufficient gripping and inaccurate centering of the wire, and interference with means to effect blade movement toward the insulation. There is need for accurate, reliable, rugged and compact stripping apparatus that is capable of rapidly and accurately stripping insulation off wire ends of different diameters and sizes, without damage to the wire cores, as well as positive and accurate gripping and centering of the wire being stripped.

SUMMARY OF THE INVENTION

It is a major object of the invention to provide apparatus meeting the above need.

Basically, the apparatus of the invention comprises, in combination:

a) a frame, b) wire clamp means on the frame for sidewardly clamping the wire sheathing, at a location spaced from the end of the wire advanced past the clamp means, c) a carriage on the frame linearly movable longitudinally toward and away from the wire clamp means, d) wire engaging guide means on the carriage for sidewardly engaging and accurately centering the wire sheathing at a location between the clamp means and said end of the wire, e) a rotating spindle on the carriage and blade means on the spindle and rotatable thereby to rotatably cut into the wire sheathing at a location proximate the guide means, the guide means carried independently of the spindle, f) means on the spindle to control depth of cutting of the blade means into the sheathing, and as the spindle rotates, g) and drive means operatively connected with the carriage to carry the blade means to selected positions along the wire and at which the blade means then cuts into the sheathing, to controlled depth, the carriage being retractable to pull a cut plug of the sheathing endwise off the wire.

It is another object of the invention to provide the means for controlling the depth of cutting of the blade means in the form of a cam, an actuator to adjust the position of the cam relative to the arm means for controllably pivoting the arm means, the blade means carried by the arm means; and the arm means, cam and actuator carried by the carriage This structure is operable entirely independently of the wire or cable centering means.

It is yet another object of the invention to provide clamp means in the form of two clamp elements, and including a drive operatively connected with said elements to move them linearly toward and away from one another. Such clamp elements may advantageously comprise two heads having parallel intermeshing plates defining opposed V-shaped jaws movable relatively toward one another to increasingly enclose and clamp the wire A further object is to provide the clamp means drive to include two crank arms having pivotal lost motion connection with the two heads to effectively displace the heads relatively toward one another in response to crank arm rotation, and including guide means to guide the heads substantially linearly toward one another in response to said crank arm displacement of the heads. The drive means may also include two drive rods carried by the frame and respectively connected with the crank arms to rotate them about parallel axes, and respectively clockwise and counterclockwise Also, the drive means may include a drive motor having lost-motion drive connection with at least one of the rods, the rods having lost-motion interconnecting therebetewen whereby rotation of one rod by the motor and in any direction effects rotation of the other rod, and in an opposite direction This allows direct transfer of clamping force from the motor to the heads.

It is another object to provide improved wire engaging guide or centering means with two guide parts that precisely center and clamp the wire or cable at a location adjacent the cutter blades, so that precise spin-severing of the insulation or sheathing from small or large wires, or cables, may be realized, and without interference, structurally or functionally, with blade movement toward the wire or cable. Such wire engaging guide means advantageously includes heads, crankarms, shafts and drive motor means of generally the same type and operating in the same manner as described above for the axially immovable clamp. This enables use of two clamps, one on the frame and one on the carriage, both operating in the same manner, to clamp and center the wire or cable and at axially spaced locations, and with precision, and independently of the blades, for significant simplification and enhanced accuracy These and other objects and advantages of the invention, as well as the details of an illustrative embodiment, will be more fully understood from the following specification and drawings, in which:

DETAILED DESCRIPTION

Figures 1, 1A:
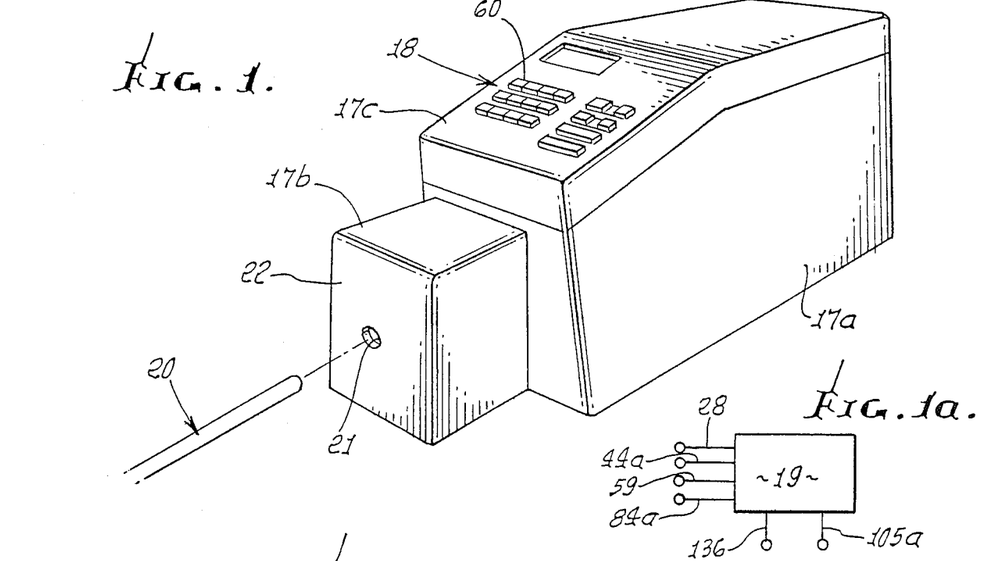
FIG. 1 is an overall perspective view of apparatus embodying the invention.
FIG. 1a shows a master controller for multiple drives.
Figure 4:
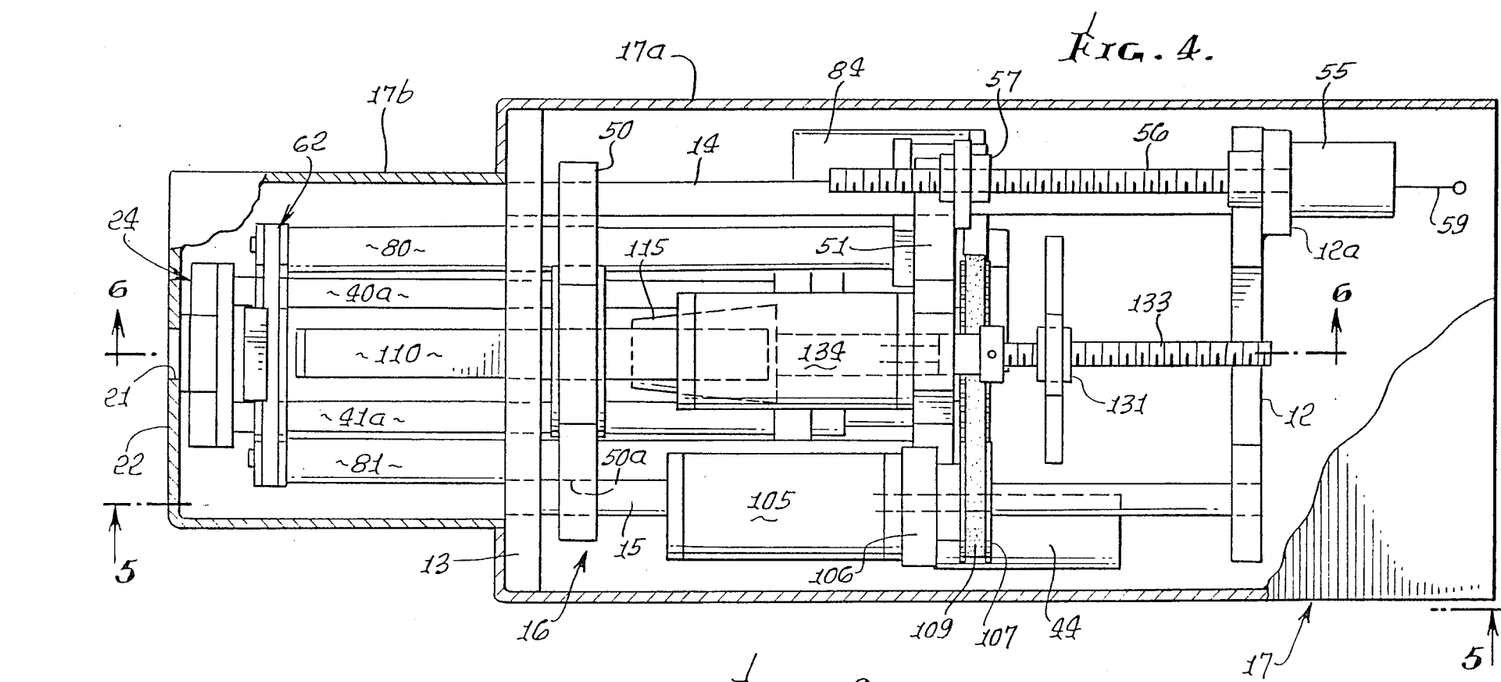
FIG. 4 is a top plan view of apparatus embodying the invention.
Figure 5:
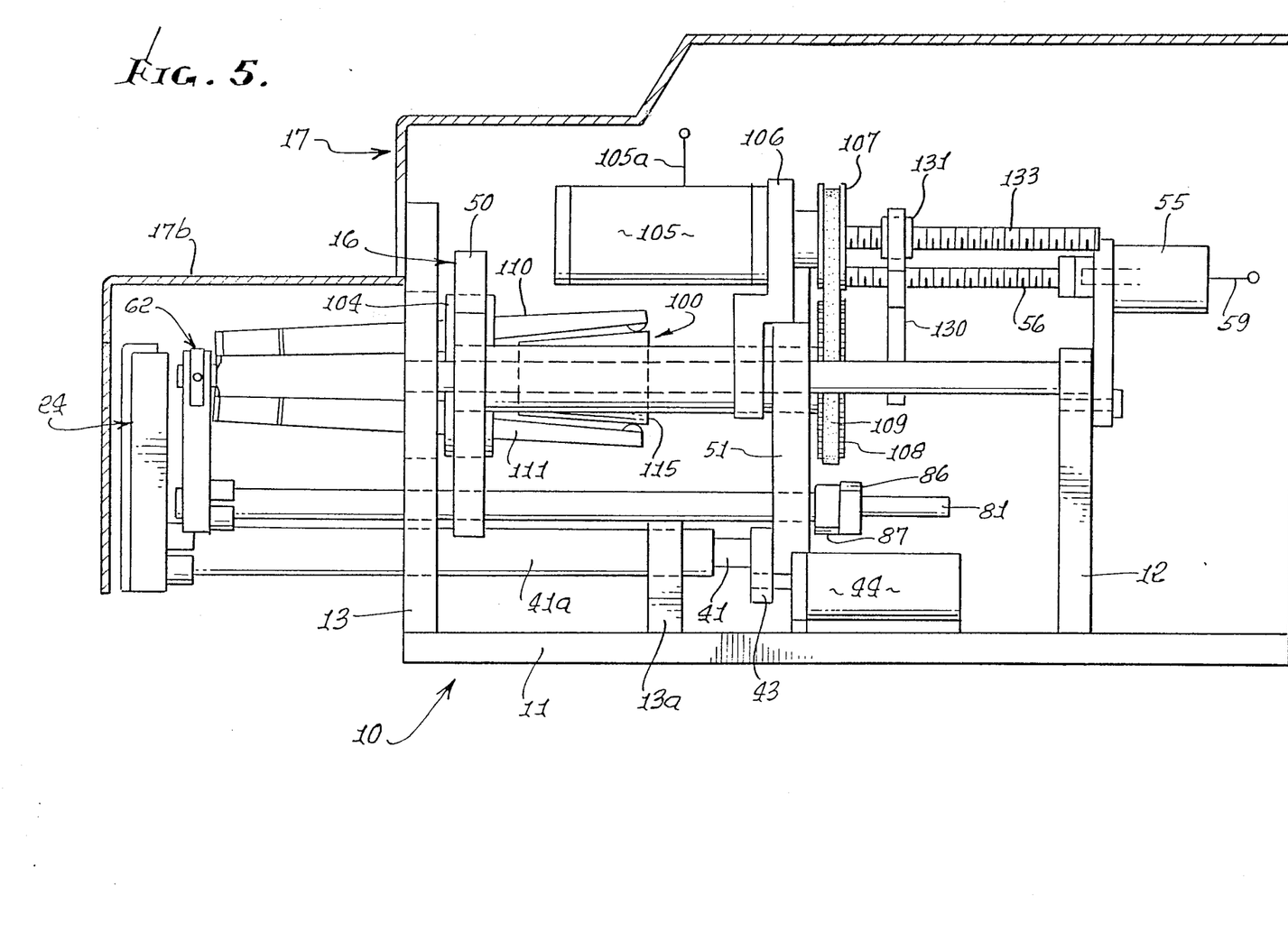
FIG. 5 is a side elevational view of the apparatus as seen in FIG. 4.

As shown in the drawings, particularly FIGS. 4 and 5, frame 10 includes a horizontal base plate 11 and upright transverse plates 12 and 13 attached to the base so as to be longitudinally spaced apart. Fixed guide rods 14 and 15 are carried by plates 12 and 13, to extend longitudinally forwardly for supporting a carriage 16 to move longitudinally forwardly and rearwardly, as will be described. A housing 17 including sections 17a and 17b is carried by and extends over the frame and carriage, and controls 18 may be carried by the housing cover 17c as seen in FIG. 1. Those controls 18 are associated with a master controller indicated at 19 in FIG. 1a.

Figure 6:
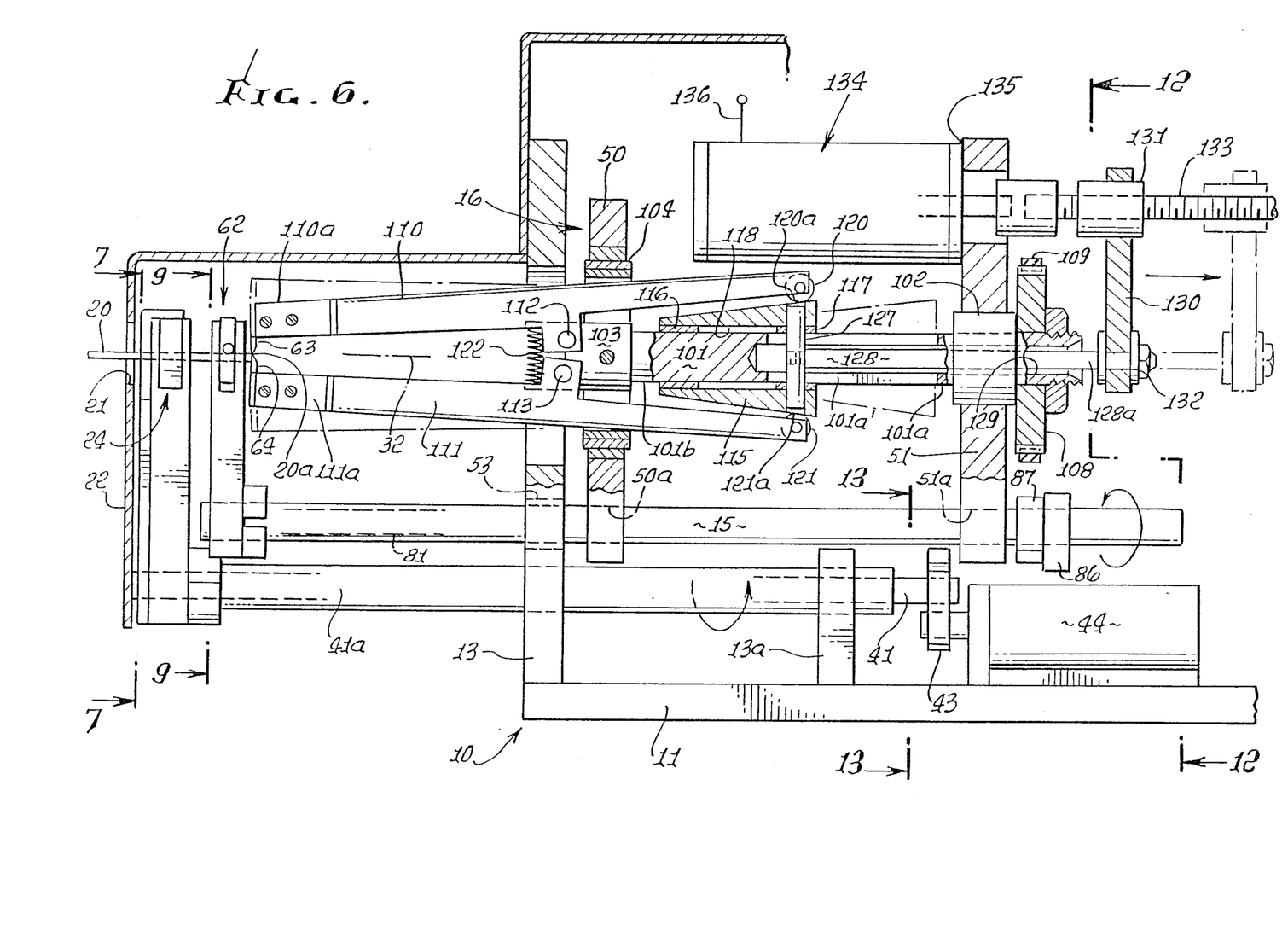
FIG. 6 is an enlarged fragmentary side elevation showing wire reception by the apparatus, and wire clamping and cutter severing of wire insulations.
Figure 11:
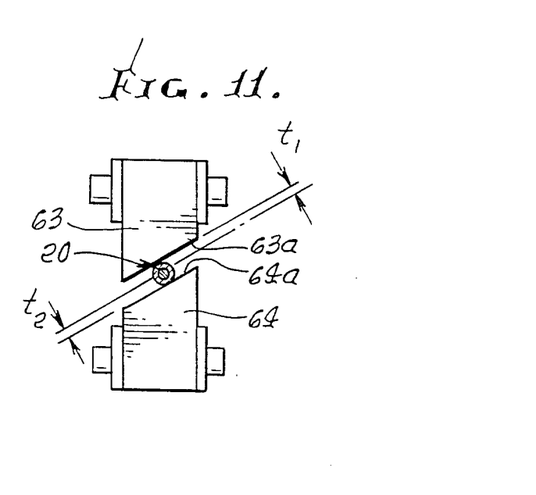
FIG. 11 is an enlarged end view of cutters or blades during insulation severing.

A wire or cable 20, seen in FIGS. 1 and 6, is advanced endwise through an opening 21 in the end wall 22 of housing 17b, as for example to a position as seen in FIG. 6. The end 20a of the wire is brought into engagement with closed blades 63 and 64, at which time controls 18 are activated to cause the wire to be sidewardly clamped as by clamp means 24 on the frame, and at a clamping position spaced longitudinally endwise from the end 20a of the wire that has moved past the clamp means. Note in FIGS. 3 and 11 the annular sheathing 20b about the wire metallic core 20c. The wire or cable may comprise a coaxial cable, for example.

Figure 7:
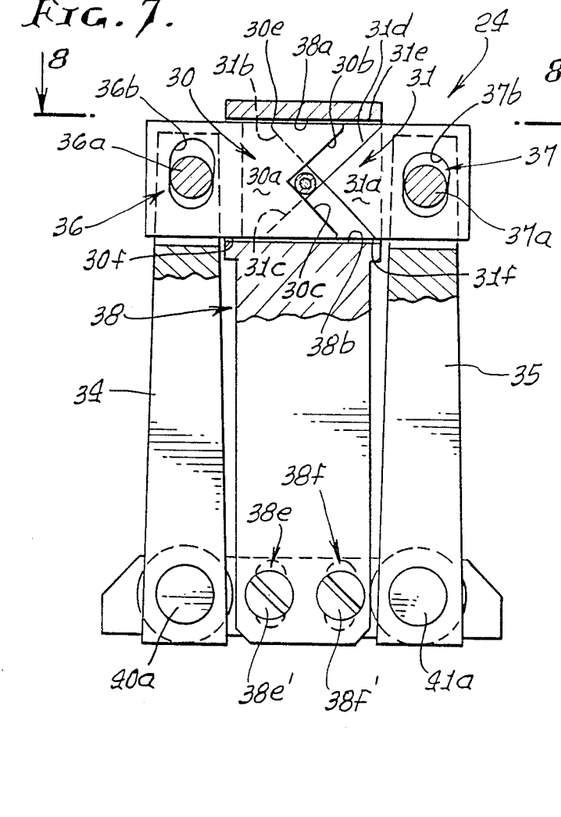
FIG. 7 is an enlarged end view, partly in section, taken on lines 7—7 of FIG. 6, showing wire clamping.
Figure 8:
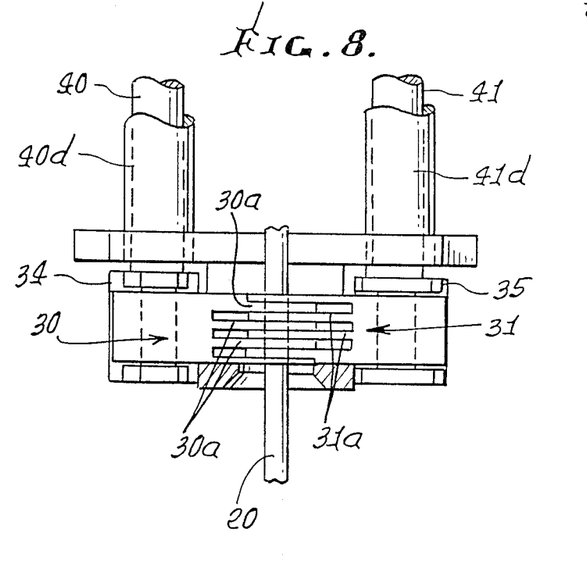
FIG. 8 is a fragmentary top plan view on lines 8—8 of FIG. 7.
Figure 13:
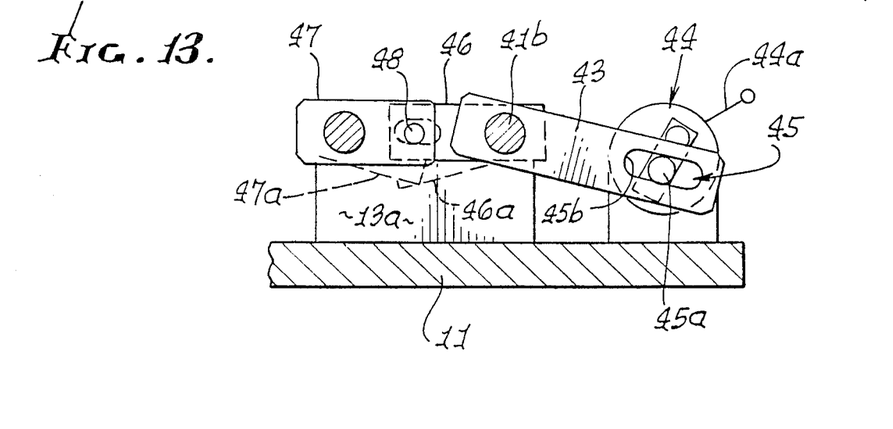
FIG. 13 is a section taken on lines 13—13 of FIG. 6, showing another drive mechanism.

The clamp means 24 may take the form of the unusually advantageous structure seen in FIGS. 7, 8 and 13. As shown in FIGS. 7 and 8, the clamp means includes two clamp elements in the form of heads 30 and 31 which are relatively movable toward one another to increasingly enclose and clamp the wire, while also centering it relative to a longitudinal axis 32, which is also the axis of rotation of a rotary spindle to be described. The two heads 30 and 31 have parallel, intermeshing plates defining opposed, laterally facing V-shaped jaws which center and grip the wire or cable, as the clamp jaws close upon the wire or cable. Thus, head 30 has parallel plates 30a with V-shaped jaws edges 30b and 30c, the plates being laterally separated; and head 31 has parallel plates 31a, with V-shaped jaw edges 31b and 31c, those plates also laterally separated and meshing with plates 30a. Angled stops on the heads, as at 31d on head 31 are engageable by edges 30b on the other head, and limit closing of the jaws, such as when no wire is between the jaws, i.e. at complete closing off of the space between the jaws. Thus, clamping effect down to the smallest wire size is readily attainable.

The heads 30 and 31 are displaced laterally toward one another by two crank arms 34 and 35 on which the heads are respectively carried, as via lost motion connections 36 and 37 allowing relative pivoting of the heads and arms and also allowing linear laterally opposite displacement of the head. Such linearity is achieved by a lateral guide 38 having parallel lateral guide shoulders 38a and 38b engageable with upper and lower lateral edges 30e and 30f, and 31e and 31f, of the heads. Connection 36 includes a pin 36a on the head 30 relatively movable in generally vertical slot 36b in the arm 34, as arm 34 rotates. See also pin 37a on head 31 movable in generally vertical slot 37b in the arm 35, as arm 35 rotates. Note also vertical adjustability of guide 38, as by tongue and groove connections at 38e and 38f with the frame part 13b, tightenable fastener 38e' and 38f' associated with the tongues. Thus, precise alignment of the V-shaped jaw apiece with axis 32 is achieved, despite the lost motion connection; and inaccurate arc-travel of the V-shaped heads toward one another is avoided.

The drive also includes two longitudinal and parallel drive rods 40 and 41 carried by sleeves 40d and 41d attached to the frame plates 13 and 13a, to rotate relative thereto and in relatively opposite directions. Rod 40 is connected at end 40a with the lower end of crank arm 34, and rod 41 is connected at end 41a with the lower rod of crank arm 35, as seen in FIG. 7. The opposite end 41b of rod 41 is connected with a crank arm 43 driven in rotation by a motor or gear motor 44, via a lost-motion tongue and groove connection seen at 45, the motor having an eccentric 45a on its output shaft that travels in the groove 45b of arm 43 to rotate that arm through a precisely controlled angle. Master control 19 has an output at 44a controlling the motor (forward and reverse, and the extent of forward and reverse rotation). Rod 41 is connected with rod 40 as via arms 46 and 47 rigidly connected with the rods, and a lost-motion tongue and groove connection 48 between those arms, whereby a precision degree of counterclockwise rotation of arm 46 and rod 40 imparts the same precision degree of clockwise rotation to arm 47 and rod 40. Note broken line rotated arm positions 46a and 47a. Clamping force is exerted by the motor and is limited or controlled by the extent of electrical energization of the motor, which is in turn controlled at 19, i.e. being selectable by means at 19.

The carriage 16 includes longitudinal guide rods 14 and 15 that are linearly movable toward and away from the above described wire clamping means. The carriage is also shown to include upright plates 50 and 51, which are longitudinally spaced apart, and have bores 50a and 51a receiving rods 14 and 15 to which the plates are connected to move longitudinally therewith. Bearings 53 in the frame plate 13 slidably receive sleeves 14 and 15. As seen in FIGS. 4 and 5, a carriage position motor 55 is carried by frame plate 12 via mounting plate 12a. The motor drives a screw 56 having threaded engagement with a nut 57 (see FIG. 4) which is rigidly attached to the carriage plate 51, for moving the carriage longitudinally horizontally, and positioning the wire sheath cutters relative to the end of the wire and relative to the clamping means as referred to above. The servo motor 55 is connected at 59 to the master control 19, and a manual selector 60 at the master control enables precise positioning of the carriage and via an encoder on the motor. The control may be digital or analog.

Wire engaging guiding and centering means is provided on the carriage for sidewardly engaging the wire sheathing at a location 62 between the clamp means 24 and end 20a of the wire, and proximate the cutters or blades 63 and 64. The purpose of such means is to hold and precisely center the wire, close to the blades but independently of blade actuation, during severing of the sheath to controlled depth, as the blades spin about the wire and advance inwardly toward the wire axis. This avoids problems of wire centering by means such as a cone that is not independent of blade actuation.

Figure 9:
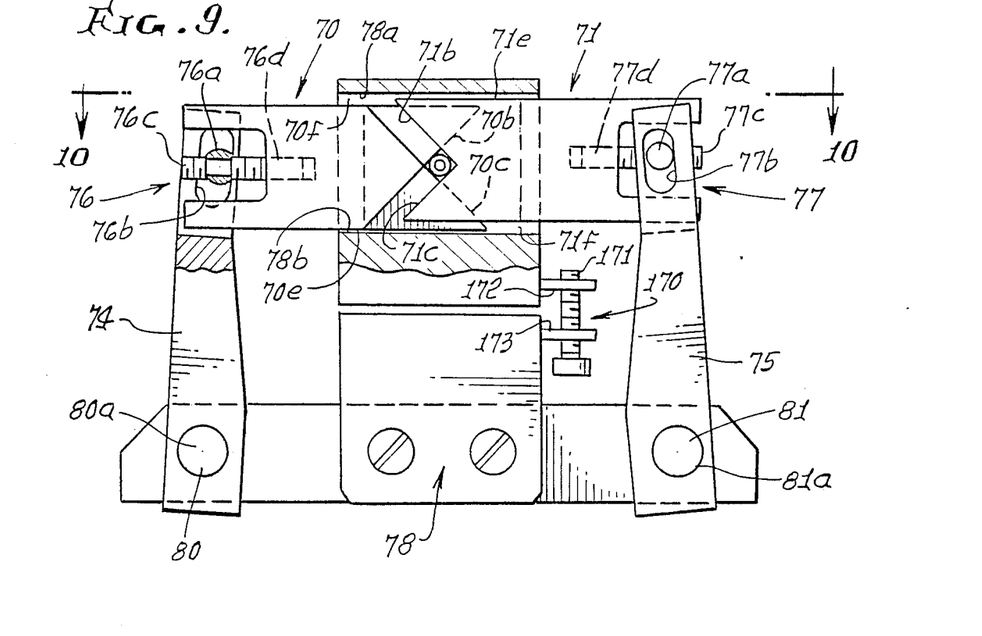
FIG. 9 is an enlarged end view, partly in section, taken on lines 9—9 of FIG. 6, showing wire centering.
Figure 10:
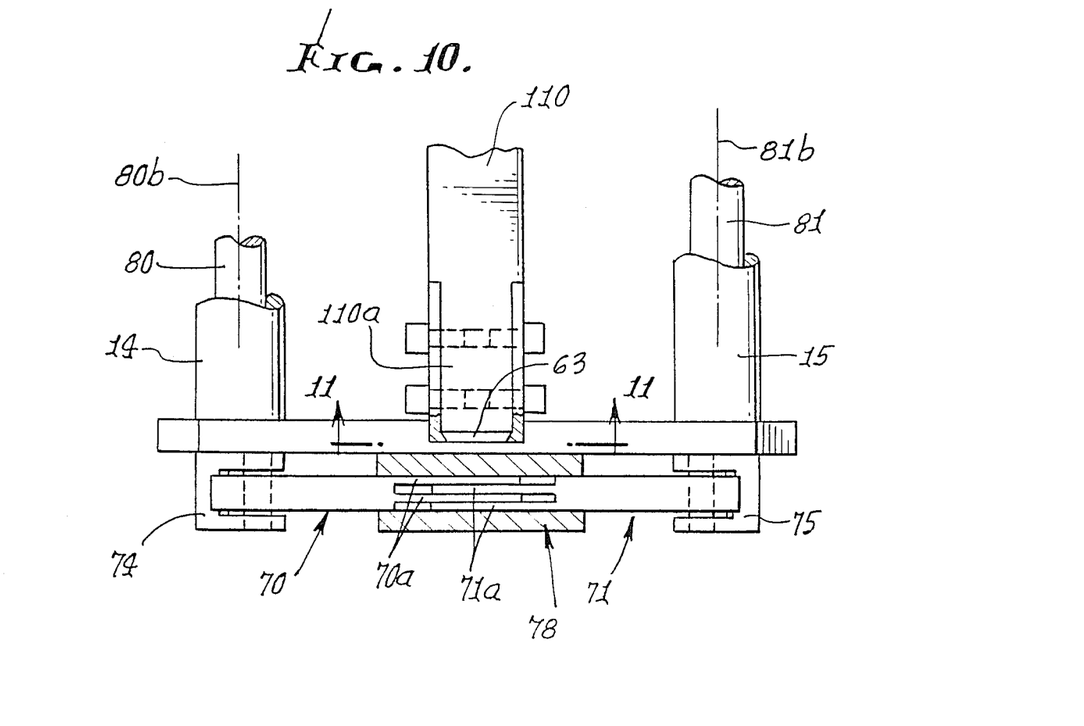
FIG. 10 is a fragmentary top plan view on lines 10—10 of FIG. 9.
Figure 12:
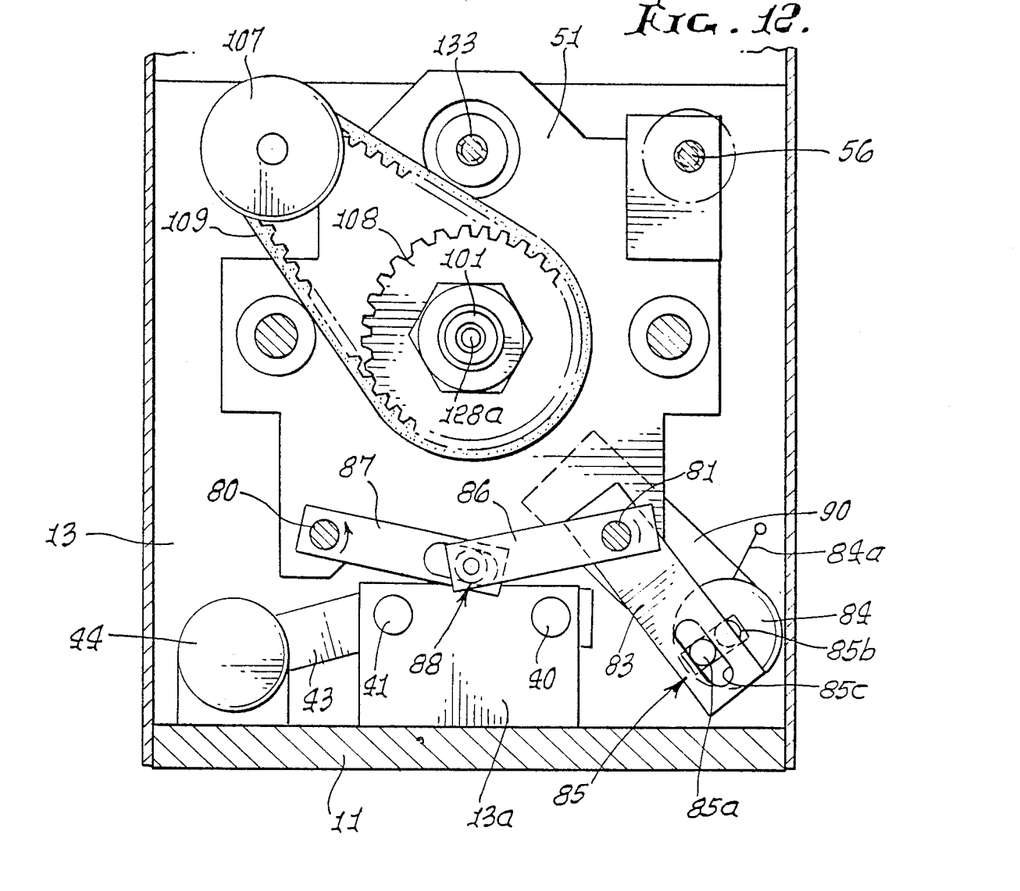
FIG. 12 is a section taken on lines 12—12 of FIG. 6, showing drive mechanism.

The guiding and centering means is shown in FIGS. 9, 10 and 12 to include two clamp parts in the form of heads 70 and 71 which are relatively movable toward one another to increasingly enclose, center-guide and clamp the wire, relative to and in alignment with the axis 32. Heads 70 and 71 have parallel, intermeshing plates defining opposed, laterally facing V-shaped jaws, i.e. having "prism" shapes which center and grip the wire or cable as the jaws close upon the wire or cable. Thus, head 70 has parallel plates 70a with V-shaped jaw edges 70b and 70c, the plates being laterally separated; and head 71 has parallel plates 71a with V-shaped jaws edges 71b and 71c, those plates also laterally separated and meshing with plates 70a. Angled stops on the heads, as at 70d on head 70, are engageable by edges 71b and 71c on the other head, and limit relative closing of the jaws, as when no wire or cable is between the jaws, i.e. at complete closing off of the space between the jaws. Thus, clamping and centering effect, down to the smallest wire size, adjacent the blades or cutters, is readily obtainable.

The heads are displaced laterally toward one another by two crank arms 74 and 75 on which the heads are respectively carried, as by lost-motion connections 76 and 77, allowing relative pivoting of the heads and arms, and also allowing linear laterally opposite displacement of the heads. Such linearity is achieved by a lateral guide 78 having parallel lateral guide shoulders 78a and 78b engageable with upper edge 71e of head 71, and lower edge 70e of head 70. See also clearances at 70f and 71f allowing limited up-down pivoting of the heads during wire centering. Connection 76 includes a pin 76a on the head 70 relatively movable in generally vertical slot 76b in the arm 74, as arm 74 rotates about axis drive rod 80. See also pin 77a on head 71 movable in generally vertical slot 77b in the arm 75, as arm 75 rotates about axis of drive rod 81. The endwise lateral positions of the pins relative to the heads is adjustable by means of threaded shanks 76c and 77c carrying the pins and having threaded connections with the heads, as at 76d and 77d. Accordingly, accurate linear movement of the jaws toward the wire or cable is achieved, and inaccurate arc-travel of the jaws is avoided.

An adjuster 170 allows vertical positioning of guide 78 relative to the device frame. For example, a threaded connector 171 extends between lug 172 on guide 78, and lug 173 on frame part 174, and is rotatable to move 78 up or down. Lug 173 supports 171 for rotation.

The drive also includes the two longitudinally parallel drive rods 80 and 81 carried on the carriage, as within sleeves 14 and 15 (see FIG. 10), to rotate relative thereto and in relatively opposite directions, about longitudinal axes 80b and 81b. Rod 80 is connected at end 80a with the lower end of crankarm 74, and rod 81 is connected at its end 81a with the lower end of arm 85, as seen in FIG. 9. The opposite end of rod 81 is connected with a crankarm 83 driven in rotation by a servo motor or gear motor 84, via a lost-motion tongue and groove connection seen at 85, the motor having an eccentric 85a on its output shaft 85b that travels in the groove 85c of arm 83 to rotate that arm through a precisely controlled angle. Master control 19 has output at 84a controlling the motor (forward and reverse and the extent of forward and reverse rotation). Rod 81 is connected with rod 80 via arms 86 and 87 rigidly connected with the rods, and a lost motion tongue and groove connection 88 between those arms, whereby a precision degree of counterclockwise rotation of arm 76 and rod 81 imparts the same precision degree of clockwise rotation to arm 77 and rod 80. Motor 84 is rigidly attached via support arm 90 to carriage plate 51. Centering (clamping) force is exerted by the motor torque, and is limited or controlled by the extent of electrical energization of the motor 84, such electrical current energization controlled at 19 and being selectable by means at 19.

A rotating spindle assembly 100 is provided on the carriage, and blades or cutters 63 and 64 are carried on the spindle to be rotated therewith, for rotatably cutting into the wire sheathing at a location adjacent or near the wire supporting clamp means 62. In the example, the spindle includes a horizontal shaft 101 defining spin axis 32, which is coaxial with the wire, as determined by the clamp and centering means referred to above, no matter the size of the wire, due to the construction and operation of the clamp and centering means. Shaft or axle 101 has one end 101a thereof supported by a bearing 102 in carriage plate 51, and the opposite end 101b of the shaft supporting a hub 103 for rotation within a bearing 104 in carriage plate 50. The shaft is rotated by a drive that includes a motor 105 seen in FIG. 5 as supported by frame plate 51 in a support plate 106, a drive pulley 107 driven about a longitudinal axis by the motor, a driven pulley 108 on the spindle shaft, and a drive belt 109 entrained by the pulleys. Motor 105 is operated via connection 105a to the master controller 19. The hub 103 pivotally mounts two longitudinally lengthwise extending arms 110 and 111, at pivot locations 112 and 113 on the hub. Blades or cutters 63 and 64 are attached to the ends 110a and 111a of those arms to be moved generally radially toward one another as the shaft 101, hub 103, and arms 110 and 111 rotate about axis 32.

Means is provided on the spindle to control the depth of cutting of the blades into the wire sheathing, as by control of movement of the blades, and their cutting edges 63a and 64a, toward one another, as the spindle rotates. See FIG. 11, and cutting extents $t_1$ and $t_2$. Such means includes a cam, in the form of an annular cone 115 mounted on the shaft for axial movement relatively therealong, as via annular bearings 116 and 117 between the cone bore 118 and the outer surface of the shaft 101. Arms 110 and 111 have cam followers such as rollers 120 and 121 mounted on their rightward ends, to engage the cone at diametrically opposite locations 120a and 121a, and a compression spring 122 between the scissors-like arms yieldably urges the arms and the followers into engagement with the cone surface This action is independent of the centering means elements and operation, as seen in FIGS. 9 and 10, whereby one does not affect or complicate the other, and also allows the centering means heads to move linearly, i.e. not on an arc due to any arm pivoting in the manner of arms 110 and 111.

The cone 115 is rotated by the shaft 101, as via a pin 127 extending radially through an axial slot 101a in the shaft and into the cone. That pin also serves to controllably displace the cone endwise on the shaft, in response to endwise movement of a link 128 extending axially within a bore 129 in the shaft and protruding at 128a. The left end of that link is shown in FIG. 6 as connected to the pin 127, and the right end of the link is connected by a support 130 with a nut 131. Support 130 does not rotate, but allows rotation of link 128 with the shaft, via bearing 132. Nut 131 is threaded on a threaded shaft 133 controllably rotated by a step or gear motor 134 the housing of which is mounted at 135 to the carriage plate 51. Accordingly, the motor controls the axial position of the cam 115, and thereby precisely controls movement of the blades toward one another, and the depth of their cut into the cable or wire insulation, as the spindle rotates. Bearing 132 not only allows rotation of the link 128 relative to support 130, but also orients the link, axially. A connection 136 from the master control 19 to the motor 134 serves to control the extent of rotation of the motor and thereby the depth of penetration of the blades into the cable or wire sheath or insulation. For example, an encoder on the motor, encoded via control 19, controls the extent of motor rotor rotation (one revolution of the motor rotor may correspond to between 0.010 and 0.100 inch of cutting jaw travel).

OPERATION

Figure 2:
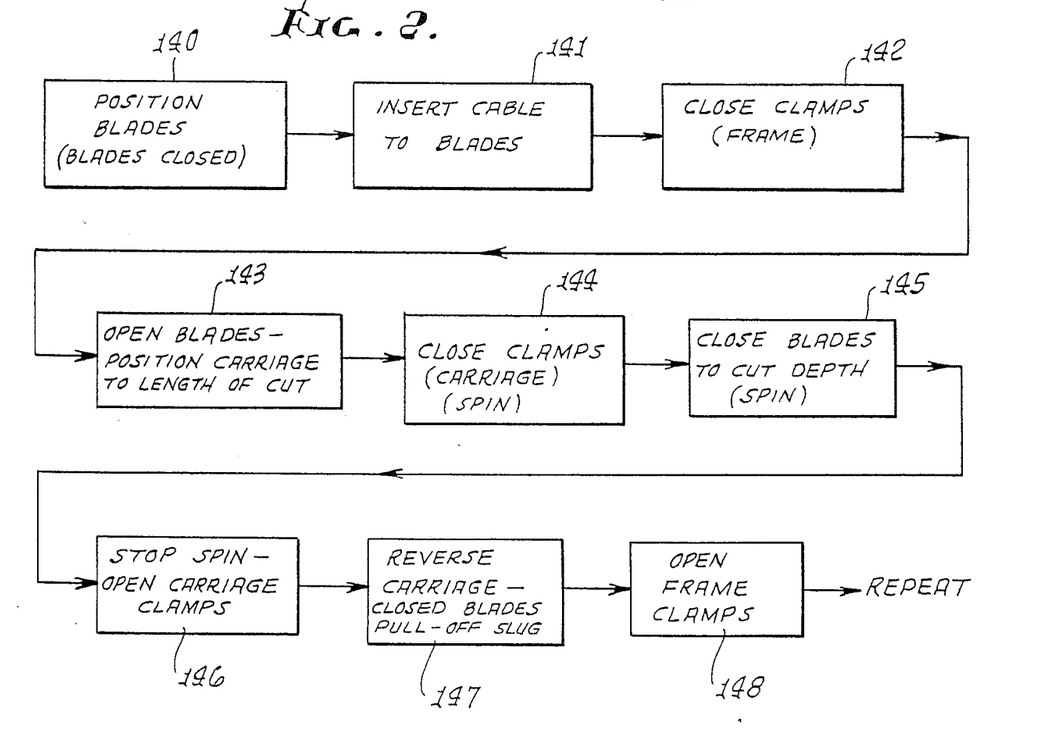
FIG. 2 is a diagram showing operational steps.
Figure 3:
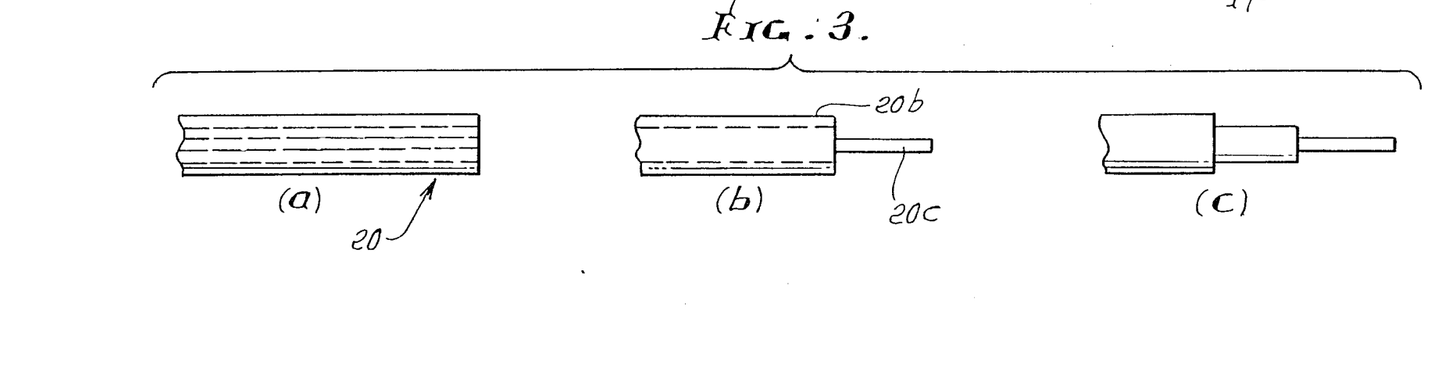
FIG. 3 is a view of a wire terminal showing steps involved in insulation stripping.
Figure 14:
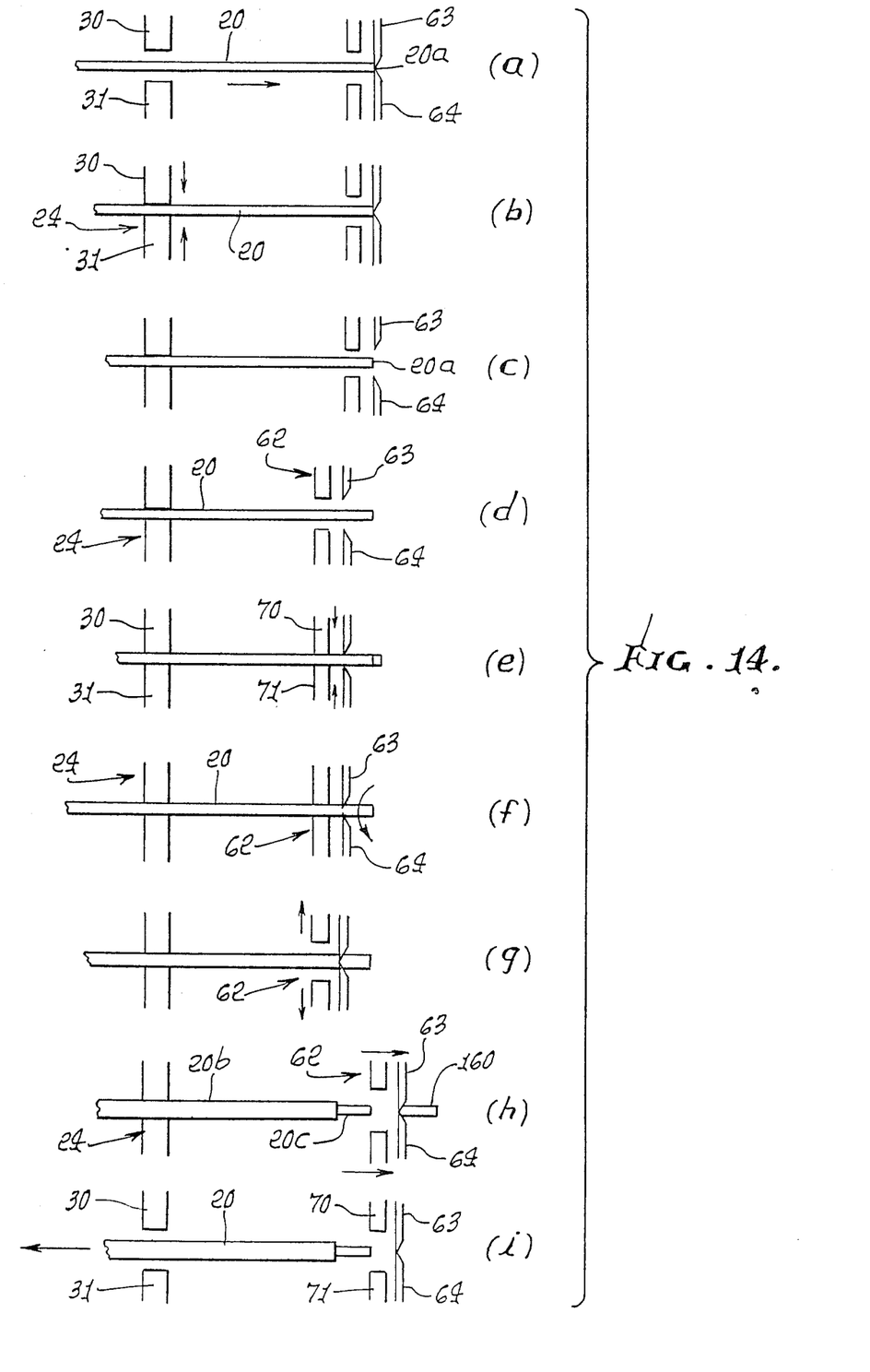
FIG. 14 is a collection of diagrammatic showings of positions of wire processing elements during cycling of the apparatus shown in FIGS. 1-13.

Referring to FIGS. 2, 3, and 14, the blades are initially closed toward one another to provide a barrier to endwise movement of the cable or wire. The wire is then inserted through opening 21 until its end 20a engages the closed blades, the axial position of which is selected by operation of carriage drive motor 55 and master control 19. See FIG. 14(a) and steps 140 and 141 in FIG. 2. At this time the carriage is in a predetermined position, endwise.

The master control is then activated to initiate its cycling. Motor 44 is activated to cause the clamp means 24 to clamp the wire. See FIG. 14(b), and step 142 in FIG. 2. Master controller 19 then operates motor 134 to cause the blades to open (retract); and controller 19 operates carriage motor 55 to cause the carriage to move axially to a selected position, i.e. at a selected distance from the wire or cable end 20a and corresponding to the length of insulation or sheathing to be removed. See FIG. 14(c) and (d), and FIG. 2 steps at 143.

The wire centering means at 62 is then closed to cause jaws 70 and 71 to move linearly and center the wire, as by operation of motor 84, and the spindle is rotated by motor 105. See FIG. 14(e), and step 144 in FIG. 2. Blade position motor 134 is then operated by the controller to cause the blades to move axially inwardly a controlled amount to sever a selected radial thickness of sheathing or insulating, as the spindle rotates. See FIG. 14(f), and step 145 in FIG. 2.

Motor 105 is then operated to stop the rotation of the spindle, and the centering means 62 released by motor 84, all under the control of master control 19. See FIG. 14(g), and step 146 in FIG. 4. The carriage travel motor 55 is then operated in reverse to retract the carriage, causing the closed blades to pull the severed insulation or sheathing 160 off the wire. See FIG. 14(h), and step 147 in FIG. 2. The clamp heads 30 and 31 are then opened by motor 44, releasing the wire or cable for pull-out in direction 161 in FIG. 14(i). See also step 148 in FIG. 2. The elements are then returned to FIG. 14(a) position.

I claim:

1. In apparatus for stripping sheathing from wire at controllable depth, the combination comprising:
   a) a frame,
   b) wire clamp means on the frame for sidewardly clamping the wire sheathing, at a location spaced from the end of the wire advanced past the clamp means,
   c) a carriage on the frame linearly movable longitudinally toward and away from the wire clamp means,
   d) a rotating spindle on the carriage and blade means on the spindle and rotatable thereby to rotatably cut into the wire sheathing,
   e) wire engaging guide means mounted on the carriage, independently of the spindle, for sidewardly engaging the wire sheathing at a location between the clamp means and said blade means,
   f) means on the spindle to control the depth of cutting of the blade means into the sheathing, and as the spindle rotates,
   g) and drive means operatively connected with the carriage to carry the blade means to selected positions along the wire and at which the blade means then cuts into the sheathing, to controlled depth, the carriage being retractable to pull a cut plug of the sheathing endwise off the wire.

2. The combination of claim 1 wherein said means to control the depth of cutting of the blade means includes pivoted arm means, a cam, an actuator to adjust the position of the cam relative to the arm means for controllably pivoting the arm means, the blade means carried by the arm means, the arm means, cam and actuator carried by the carriage.

3. The combination of claim 2 wherein said arm means includes two arms pivoted to swing oppositely in response to movement of the cam, longitudinally.

4. The combination of claim 3 wherein the cam comprises a cone extending between said arms.

5. The combination of claim 1 wherein said clamp means includes two clamp elements, and including a drive operatively connected with said elements to move them relatively toward and away from one another.

6. The combination of claim 1 including second drive means on the carriage and operatively connected with the spindle to rotate same, the spindle being rotatably mounted on the carriage.

7. The combination of claim 6 wherein the spindle has a longitudinal axis of rotation, said blade means including at least two blades carried by the spindle for movement toward and away from said axis.

8. The combination of claim 5 wherein said elements comprise two heads having parallel intermeshing plates defining opposed V-shaped jaws movable relatively toward one another to increasingly enclose, clamp and center the wire.

9. The combination of claim 8 wherein said drive means includes two crank arms having pivotal lost motion connection with said heads to effectively displace the heads relatively toward one another in response to crank arm rotation, and including guide means to guide the heads substantially linearly toward one another in response to said crank arm displacement of the heads.

10. The combination of claim 9 wherein said drive means includes two drive rods carried by the frame and respectively connected with the crank arms to rotate them about parallel axes, and respectively clockwise and counterclockwise.

11. The combination of claim 10 wherein the drive means includes a drive motor having lost motion drive connection with at least one of the rods, the rods having lost motion interconnection therebetween whereby rotation of one rod by the motor and in any direction effects rotation of the other rod, and in an opposite direction.

12. The combination of claim 8 including interengageable stops on the heads to limit relatively closing together of the jaws.

13. The combination of claim 1 wherein said wire engaging guide means includes two guide parts, and including a drive operatively connected with those parts to move them relatively toward and away from one another.

14. The combination of claim 13 wherein said parts comprise two heads having parallel intermeshing plates defining opposed V-shaped jaws movable relatively toward one another to increasingly enclose, clamp and center the wire.

15. The combination of claim 14 wherein said drive includes two crank arms having pivotal lost motion connection with said heads to effectively displace the heads relatively toward one another in response to crank arm rotation, and including guide means to guide the head substantially linearly toward one another in response to said crank arm displacement of the heads.

16. The combination of claim 10 wherein said drive includes two drive rods on the carriage and respectively connected with the crank arms to rotate them about parallel axes, and respectively clockwise and counterclockwise.

17. The combination of claim 16 wherein the drive includes a drive motor having lost motion drive connection with at least one of the rods, the rods having lost motion interconnection therebetween whereby rotation of one rod by the motor and in any direction effects rotation of the other rod, and in an opposite direction.

18. The combination of claim 14 including interengageable stops on the heads to limit relative closing together of the jaws.

19. The combination of claim 13 wherein said drive for said wire engaging drive means parts includes a selectively energizable electrical motor operable to create selected torque to provide selective force exerted by said parts on the wire.

* * * * *